Dec. 8, 1970     V. WOUK     3,546,548

CONTROL APPARATUS FOR ELECTRIC AUTOMOTIVE VEHICLES

Filed April 5, 1968     3 Sheets-Sheet 2

INVENTOR
VICTOR WOUK by: Wallenstein, Spangenberg, Hattis & Strampel
ATTYS.

United States Patent Office 3,546,548
Patented Dec. 8, 1970

3,546,548
CONTROL APPARATUS FOR ELECTRIC AUTOMOTIVE VEHICLES
Victor Wouk, New York, N.Y., assignor to Gulton Industries, Inc., Metuchen, N.J., a corporation of New Jersey
Filed Apr. 5, 1968, Ser. No. 719,015
Int. Cl. H02p 3/14
U.S. Cl. 318—139                                    23 Claims

ABSTRACT OF THE DISCLOSURE

A braking and battery recharging system for an electric motor driven and battery powered automotive vehicle comprising a motor circuit modifying means responsive to operation of a braking control member by converting the electric motor to an electric generator to produce a D.C. voltage substantially in excess of the battery voltage for car speeds extending from a normal cruising speed down to a given relatively low speed which is a fraction of the cruising speed, means responsive to opeartion of said braking control member by boosting the output of the electric generator and coupling the current resulting from the boosted voltage to said battery to charge the same and effect regenerative braking of the automotive vehicle, normally inoperative mechanical braking means for stopping the car below said given relatively low speed and means rendering said mechanical braking means operative below said given relatively low speed.

---

The invention relates primarily to the control of battery powered automotive vehicles, although some aspects of the invention have a broader application. More particularly, the invention deals primarily with speed and braking control circuits for such vehicles.

The problem of air pollution which has recently become particularly serious in many cities has stirred the development of electric automotive vehicles because modern hermetically sealed batteries can be used to power such vehicles without the production of noxious fumes. From a long range standpoint, electric automotive vehicles will also be important when fossil fuel sources will become depleted.

The design of battery automotive vehicle to satisfy modern day transportation needs poses many substantial problems. Such a vehicle must, of course, have the necessary speed, acceleration and mileage capability between recharging of the battery to satisfy the needs of the particular vehicle involved. Thus, a vehicle used on the open highway should, for convenience, be capable of going a long distance, such as three hundred miles or more, at a relatively high speed before requiring a battery recharge. A vehicle designed only for local use, such as a delivery truck or second family car used for local driving, would serve most of the owner's purposes if it could be driven at a speed of about 40 miles per hour or less for 100 miles before requiring a battery recharge. The aerodynamic losses at a speed of 60 miles per hour are many times that occurring at 40 mile per hour and such losses are large relative to friction and other losses. Thus, if a vehicle going 60 miles per hour needs a 22 horse power motor, the same vehicle would need only a 6 horse power motor if driven only 40 miles per hour. The capacities of some battery systems which have already been developed are such that they are practical for operating automotive vehicles at the low speeds and mileages referred to for local driving applications.

A common "figure of merit" for batteries is based on the number of watt-hours per pound obtainable therefrom. The conventional lead acid storage battery has a "figure of merit" of approximately 10 watt-hours per pound. The most recently developed batteries, such as the lithium-nickel floride battery developed by Gulton Industries, Inc., has a "figure of merit" of approximately one hundred watt-hours per pound. Gasoline provides the equivalent of approximately 1000 watt-hours per pound. The lithium-nickel flouride batteries and nickel-cadmium batteries are especially useful as power sources for automotive vehicles.

One of the objects of the invention is to provide a battery operated automotive vehicle which maximizes the utility of the available battery power so that the vehicle can travel a maximum distance between successive battery charging operations.

A related object of the invention is to provide a battery operated automotive vehicle as described which makes efficient use of the de-acceleration or braking of the vehicle to return power to the battery system thereof.

Still another related object of the invention is to provide a vehicle as just described wherein the motor is used as an effective braking and battery recharging means at speeds varying from normal cruising speeds down to speeds which are a small fraction of the normal cruising speeds.

A further object of the invention is to provide a regeneartive braking system using the motor as a generator during de-acceleration or braking of the automotive vehicle which system is reliable and can be made at a cost which is not undully great.

Another object of the invention is to provide circuitry for controlling the flow of power from a battery to a variable speed electrical motor which can drive an automotive vehicle so that a smooth acceleration is achieved at minimum losses in the electrical control circuitry.

An overall object of the invention is to provide a battery operated automotive vehicle which has a speed and braking control circuit which operates with a smoothness and effectiveness which would approximate that of the present day gasoline powered automotive vehicles.

Perhaps one of the most important aspects of the invention is in the manner in which the de-acceleration or braking of the automotive vehicle is utilized in the recharging of the battery. In an urban vehicle, subject to frequent start-and-stop operation, with the slowing down time equalling an appreciable part of the accelerating time, a significant amount of power can be regained by the battery if the kinetic energy of the moving vehicle is returned by some reasonably efficient system into the batteries. Calculations of the watt-hours that could be returned to the battery in a bus using the present invention and slowing down from 30 miles per hour to a halt show that the battery capacity can be effectively increased by as much as 20 to 30 percent. In the most preferred form of the invention, a series D.C. motor is used to drive the vehicle because a series motor has excellent acceleration characteristics. During the braking of the automotive vehicle, the motor is converted to a D.C. generator preferably by switching a normally inoperative shunt field winding to the battery, and disconnecting the armature of the motor from the battery, so that the output of the armaure of the motor becomes the output of a generator which is utilized to recharge the battery during the braking of the vehicle. This recharging of the battery also supplies regenerative braking of the vehicle. The battery voltage is desirably a large D.C. voltage, like 100 volts. To recharge the battery and to achieve regenerative braking, the voltage produced from the motor armature must be higher than the 100 volt output of the battery, which is not difficult to achieve across the motor armature at relatively high vehicle speeds and a shunt field winding of modest size. However, at low speeds an exceedingly large shunt field winding is necessary to provide a voltage in excess of 100 volts to recharge the battery and to effectively brake the vehicle. In accordance with one aspect of the invention, the effective braking of the battery powered automotive vehicle and the efficient recharging of the battery can take place even at low speeds and using a shunt field winding of very modest size by connecting a voltage boosting circuit between the motor armature and the battery, the voltage boosting circuit boosting the voltage at the motor armature to a value above the voltage of the battery at the low speeds as well as at the high speeds.

In the most preferred form of the invention, it is contemplated that the brake pedal will operate like a conventional brake pedal where the degree of braking action is fairly constant for a given degree of depression of the brake pedal at speeds down to the lowest speed where the regenerative braking is to be effective. To this end, the average voltage and the current voltage of the voltage boosting circuit is maintained at a level proportional to the brake pedal depression and independent of the speed of the motor armature. This is most advantageously achieved by varying the magnitude of the shunt field winding current or the average current flowing through the voltage boosting circuit in direct proportion to the brake pedal depression and in inverse proportion to the speed of the motor armature.

The voltage boosting circuit referred to cannot bring the vehicle to a complete stop because near zero speed the voltage developed across the motor armature is near zero. In accordance with another aspect of the invention, mechanical braking means is provided which preferably comes into effect only when the brake pedal is depressed beyond a given point. Up to this point, the vehicle is slowed by the regenerative braking action described above. Thus, in this preferred form of the invention, the combined regenerative and mechanical braking system appears to operate like a conventional mechanical braking system. Also, in addition to the advantages referred to the mechanical braking system is subject to relatively little wear compared to a conventional mechanical braking system because, normally, it is used only to bring the vehicle to a complete stop after the regenerative braking system has slowed the vehicle down to a very low speed. The use of a combined mechanical and regenerative braking system as described also increases the safety factor of the braking system of the automobile since a failure in either the mechanical or regenerative portion of the braking system does not affect the ability of the other to operate.

Other aspects of the invention relate to the specific circuitry utilized for the voltage boosting circuit and also the circuitry used for controlling the magnitude of current flow between the battery and the D.C. motor to control the speed thereof, which circuitry is designed to minimize circuit losses so the drain on the battery is minimized and to maximize circuit reliability.

The above and other objects, advantages and features of the invention will become apparent upon making reference to the specification to follow, the claims and the drawings wherein:

Figure 1:
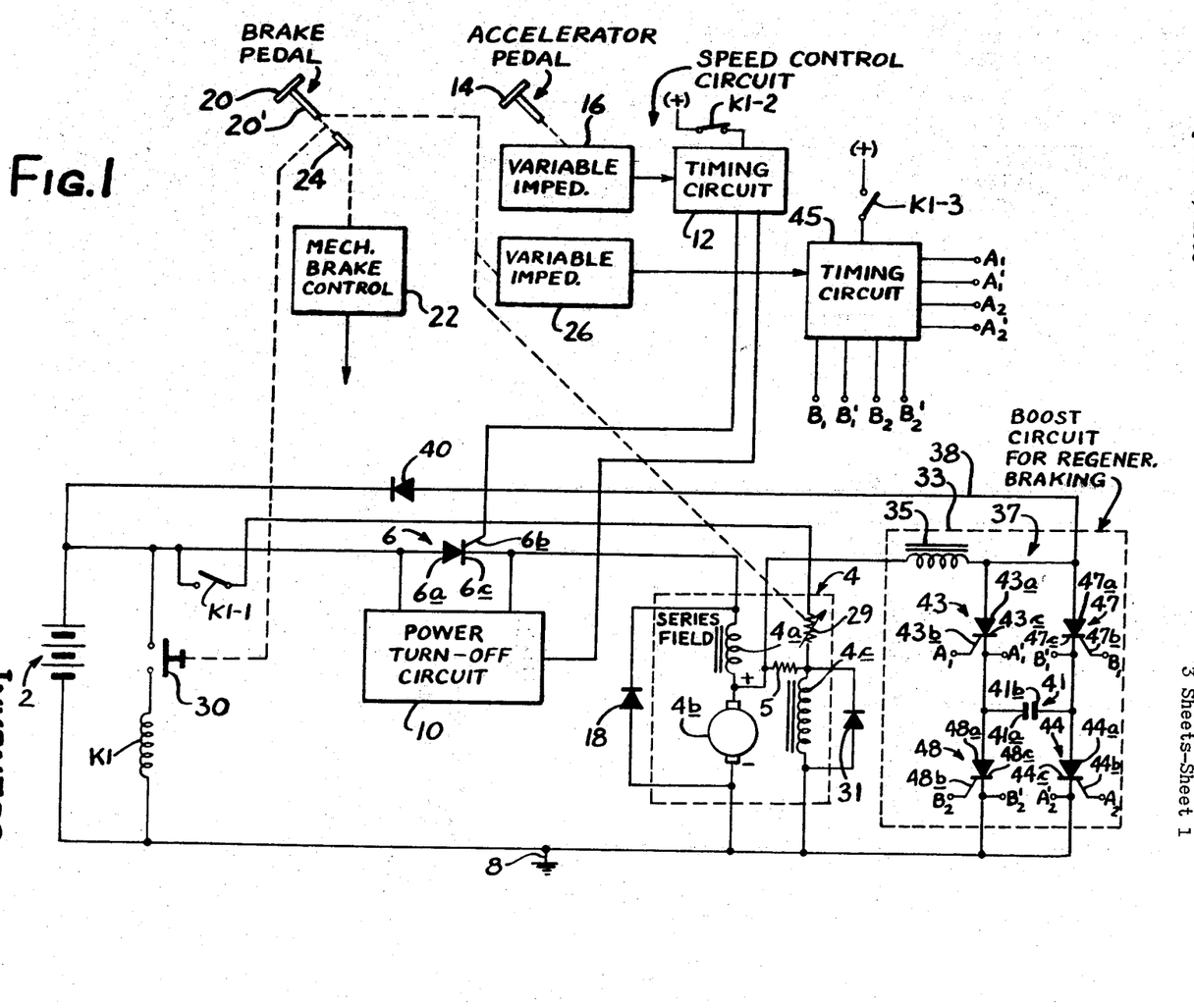
FIG. 1 is a simplified diagram, partly in block form, of a speed and braking control system of a battery powered automotive vehicle which incorporates various features of the present invention.

Referring now to FIG. 1, reference numeral 2 identifies one or more batteries for supplying power to a motor 4 which drives the automotive vehicle involved. The motor 4 is, most advantageously, a series D.C. motor having a series winding 4a and an armature 4b. The motor also has a field winding 4c which, except during normal braking of the vehicle, may be completely inoperative or, as illustrated, may normally be connected to the motor armature through a current limiting resistance 5 which provides a small current in the shunt winding to prevent runaway of the series motor under no load conditions, such as when the vehicle is jacked up or the car is free wheeling downhill. To approximate the speed control of a conventional automotive vehicle, the average power delivered to the motor 4 is controlled by the adjustment of the duty cycle of an electronic switch, which is most preferably a power thyristor 6 having anode and cathode electrodes 6a–6c connected respectively between the positive terminals 2a of the batteries and the series field winding 4a. (The thyristor is a semiconductor device, such as an SCR or silicon-controlled rectifier, which, when fired by the feeding of a suitable signal to a control electrode 6b thereof, continues to conduct heavily until the flow of current is interrupted thereto as by the feeding of a reverse voltage across the anode and cathode electrodes 6a–6c.) The opposite terminals of the batteries 2 are preferably connected to ground 8 which may be the frame of the automotive vehicle.

The power thyristor is periodically switched on by the feeding of suitable firing or turn-on pulses to the control electrode 6b from a timing circuit 12. The power thyristor 6 periodically is switched off by the coupling of reverse voltage pulsations across the anode and cathode terminals 6a–6c from a power turn-off circuit 10 which is synchronized by timing or control pulses fed from the timing circuit 12. The relative phase of the turn-on and turn-off pulses fed from the timing circuit to the control electrode 6b of the thyristor 6 and the power turn-off circuit is determined by the position of the accelerator pedal 14 or other speed control member of the automotive vehicle. The accelerator pedal 14 may, for example, vary an impedance 16 in accordance with the position of the accelerator pedal 14 and thereby vary the frequency or timing of the pulses generated by the timing circuit 12. The timing circuit to be described later on in the specification is designed to insure the operation of the power turn-off circuit 10 before the feeding of a turn-on pulse to the power thyristor 6. Otherwise, the preferred power turn-off circuit 10 to be described could not operate to render the power thyristor 6 non-conductive.

To avoid the generation of excessive voltages in the series field winding 4a and the motor armature 4b when the power thyristor is rendered non-conductive, a "by pass" rectifier 18 is connected across the armature and series field winding circuit so that the D.C. armature current has a path for current flow at that time.

As previously indicated, one of the aspects of the invention is the provision of a unique regenerative braking system which responds to the depression of a brake pedal 20 or the like to de-accelerate the vehicle down to a given lower speed. The vehicle is brought to rest completely by the operation of a mechanical braking control means 22 which operates preferably only by depressing the brake pedal to its fullest extent.

The means for preventing operation of a mechanical braking control means 22 until the brake pedal has been fully depressed may take a variety of forms. As illustrated, a lost motion connection is provided between a mechanical brake operating member 24 and the brake pedal shaft 20' so that the operating member 24 is operated only when the brake pedal shaft 20′ is moved a given distance. As the brake pedal 20 is moved from its initial reference position, a variable means 26, which may be a variable impedance, is progressively adjusted in accordance with the degree of movement of the pedal.

As soon as the brake pedal leaves its initial position, a switch 30 is closed to energize a relay K1 to close a set of normally-open contacts K1–1 to connect a shunt field winding 4c forming part of the D.C. motor structure 4 to the positive terminals of the batteries 2. The other end of the shunt field winding 4c is connected to the vehicle ground 8. It is preferred that a brake pedal controlled resistor 29 be placed in series with the shunt winding 4c so that the current flow through the shunt field winding 4c will progressively increase with the depression of the brake pedal 20 whereby the voltage generated across the motor armature 4b will not be excessive when the brake is applied at high speeds. Energization of the relay K1 also opens a set of normally-closed contacts K1–2 which de-energizes the timing circuit 12 to prevent the firing of the power thyristor 6 while the brake pedal 20 is depressed.

The connection of the shunt field winding 4c to the batteries 2 will convert the D.C. motor to a D.C. generator which will produce a voltage at the terminals of the motor armature 4b which will depend upon the speed of rotation of the armature and the shunt field current. When the brake pedal 20 is released, contacts 30 will open to de-energize the relay K1. To prevent the generation of excessive voltages in the shunt field winding 4c, by-pass rectifier 31 is connected across the shunt field winding 4c.

The voltage coupled to the batteries 2 during braking of the vehicle when the motor is operating as a generator must be greater than the voltage output of the battery 2 to feed recharging current to the battery and to produce a regenerative braking action. To produce such a voltage across the armature 4b at low vehicle speeds would normally require a bulky and costly field winding 4c. However, in accordance with another aspect of the invention, the voltage developed across the motor armature 4b when the motor is operated as a generator is boosted by voltage boosting circuit 33 coupled between the armature terminals and the batteries 2. The voltage boosting circuit may take a variety of well known forms. However, for the purposes of the present invention, it most advantageously is the unique circuit shown in FIG. 1 which is an exceedingly simple, reliable and efficient circuit where the amount of the voltage boost obtained is readily varied.

Figure 2:
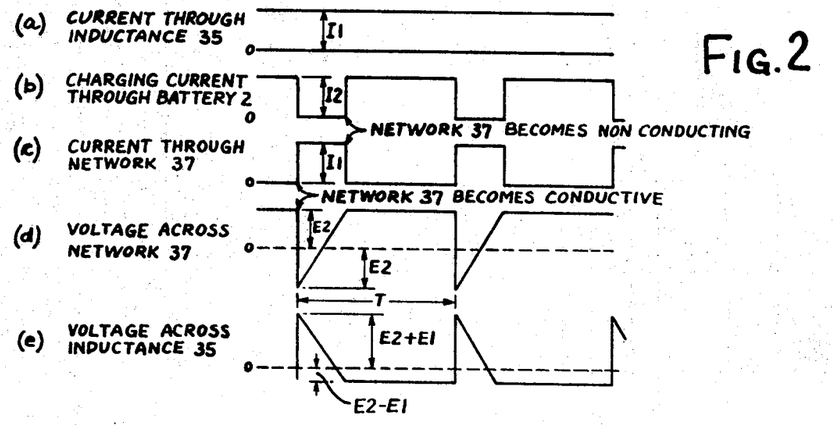
FIGS. 2(a) through 2(e) show the waveforms of current and voltage in various parts of the voltage boosting circuit forming part of the control system of FIG. 1.

The voltage boosting circuit 33 includes an inductance 35 connected to one end of the motor armature 4b and a highly simple and efficient current control network generally indicated by reference numeral 37 connected between the output end of the inductance 35 (i.e. the end remote from the armature 4b) and ground (i.e. other end of the armature 4b). One of the novel aspects of the voltage boosting circuit 33 is in the current control network 37. The current control network 37 is cyclically alternately rendered conductive and non-conductive at a frequency depending upon the degree to which the brake pedal 20 is depressed. The output of the voltage boosting circuit is coupled by a conductor 38 connected to the output end of the inductance 35 and an isolating rectifier 40 which conducts when the output of the voltage boosting circuit exceeds that of the battery 2. When the current control network 37 is rendered conductive, a current will flow through the inductance 35 and the current control network 37. The waveform I1 of the current flow in the inductance 35 is shown in FIG. 2(a). When the current control network is rendered non-conductive, the current flow through the inductance 35 will be diverted to the load which will tend to reduce the current flow through the inductance. However, the inductance will develop a voltage which will tend to keep a constant current flow therethrough and this voltage (E2–E1) shown in FIG. 2 (e) is the boost voltage of the circuit (where E2 is the voltage of the battery 2 and E1 is the D.C. voltage across the motor armature 4b). With the current control network to be described, this boost voltage varies with the length of the period T between successive interruptions of current flow in the current control network 37.

In accordance with a specific aspect of the invention, the current control network 37 is a thyristor control circuit including a turn-off capacitor 41 having a pair of plates 41a–41b connected between a first pair of thyristors 43–44 and a second pair of thyristors 47 and 48. The cathode and anode electrodes 43a and 43c of the thyristors 43 are respectively connected between the capacitor plate 41a and the end of the inductance 35 remote from the armature 4b, and the anode and cathode electrodes 44a and 44c of the thyristor 44 are respectively connected between the capacitor plate 41b and ground. The thyristor 47 has anode and cathode electrodes 47a–47b respectively connected between the end of the inductance 35 remote from the armature 4b and the capacitor plate 41b. The thyristor 48 has anode and cathode electrodes 48a and 48b respectively connected between the capacitor plate 41a and ground 8.

Firing or turn-on pulses are initially fed to the control electrodes 43b–44b and 47b–48b of the thyristors 43–44 and 47–48 from a brake pedal controlled timing circuit 45, to cause the capacitor 41 to charge. The timing circuit 45 has pairs of outputs A1–A1′, A2–A2′, B1–B1′ and B2–B2′ which are respectively connected between the control and the cathode electrodes of the thyristors 43, 44, 47 and 48 to fire the same in the manner just described. The timing circuit 45 is energized through a set of normally-open contacts K1–3 of relay K–1 so that it operates only when the brake pedal 20 is depressed. In the circuit illustrated, the voltage on the capacitor 41 is clamped to the value of the voltage E2 of the battery shown in FIG. 2(d) so that conduction of the thyristors 43–44 or 47–48 will cease when the capacitor charges to this voltage. The capacitor 41 thus acts as a means for automatically periodically rendering the thyristors 43 and 44 non-conductive. Once the voltage boosting circuit is in operation, when turn-on pulses are fed to the thyristor pair 43–44 or 47–48, capacitor 41 will be initially charged in a direction to aid the conduction of the thyristors involved. The capacitor 41 then discharges and recharges to a voltage of inverse polarity to what it was previously. FIG. 2(d) shows the waveform of the voltage across the current control network 37 and FIG. 2(c) shows the waveform of the current flow therethrough. It is seen from FIG. 2(b), which shows the waveform of the current flow from the voltage boosting circuit to the battery that when the current control network 37 ceases to conduct, the current in the inductance 35 will then flow through the load, namely through the rectifier 40 and the battery 2 to charge the battery and to regeneratively brake the motor 4. FIG. 2(e) shows the variation of voltage across the inductance 35 which generates the boost voltage. The average value of this boost voltage developed across the inductance 35 and the average value of the current flowing to the battery when the current control network 37 is rendered non-conductive is dependent on the frequency at which the network is rendered conductive or non-conductive. The variable impedance 26 is connected to or forms part of the timing circuit so the frequency of the timing circuit pulses increases with the degree of movement of the brake pedal 20 from its initial or reference position.

Figure 3:
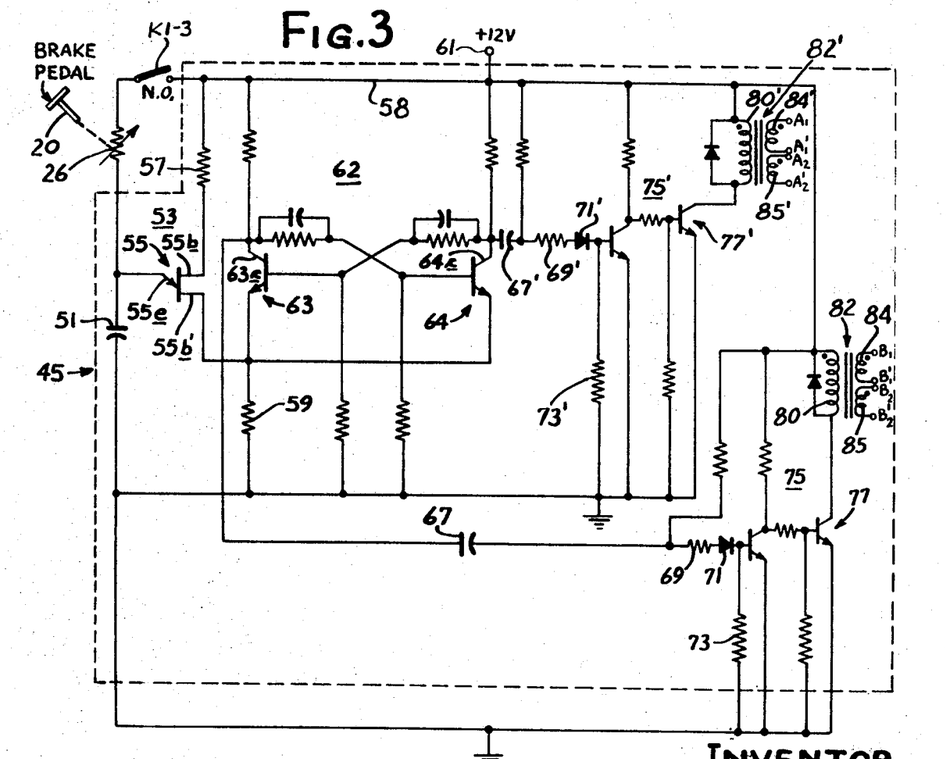
FIG. 3 is a circuit diagram of the timing circuit for the voltage boosting circuit forming part of the braking portion of the control system shown in FIG. 1.

Refer to FIG. 3 which shows a circuit for the timing circuit 45. As shown in FIG. 3, the brake pedal operated variable impedance 26 is a variable resistor connected in series with a capacitor 51 forming a capacitor charge circuit for controlling the operation of a relaxation oscillator circuit 53 of conventional design. The juncture of the resistor 26 and the capacitor 51 is connected to the emitter electrode 55e of a unijunction transistor 55. One of the bases 55b of the unijunction transistor 55 is connected through a resistor 57 to a conductor 58 extending to a source of D.C. energizing voltage 61, and a resistor 59 is connected between the other base 55b' of the unijunction transistor 55 and ground. The end of the capacitor 51 remote from the resistor 26 is ground, and the end of the resistor 26 remote from the capacitor 51 is connected to the D.C. source 61 through normally opened contacts K1–3 which close during the braking of the vehicle involved. Thus, the closure of the contacts K1–3 connects the source of energizing voltage 61 to the capacitor charge circuit comprising the resistor 56 and the capacitor 51. The magnitude of the resistor 26 determines the speed with which the voltage across the capacitor 51 reaches the firing voltage of the unijunction transistor 55, the firing of which discharges the capacitor 51 and produces a positive pulse across resistor 59.

The resistor 59 also forms part of a cathode coupled bistable circuit 62 of more or less conventional design which includes a pair of NPN transistors 63 and 64, connected to various resistors and capacitors, as indicated. These transistors 63 and 64 are in opposite states of conduction at any given time (i.e. one is conductive while the other is non-conductive). Each time a positive pulse is developed across the resistor 59, the conditions of the transistors 63 and 64 will reverse. The change of state of the transistors 63 and 64 from a conductive to a non-conductive state will result in a sudden rise of the voltage at the collector electrode 63c or 64c thereof. The collector electrode 63c of the transistor 63 is coupled to a differentiating network comprising a capacitor 67, resistor 69, negative pulse-blocking rectifier 71 and resistor 73, so that a sharp positive pulse is produced across the resistor 73 each time the transistor 63 is switched from the conductive to a non-conductive state.

Similarly, the collector electrode 64c of the transistor 64 is coupled to a differentiating network comprising a capacitor 67', resistor 69', negative pulse-blocking rectifier 71' and resistor 73'. Thus, each time the transistor 64 is switched from a conductive to a non-conductive state a sharp positive pulse appears across the resistor 73'. It is apparent that the pulses appearing across the resistors 73 and 73' are 180 degrees apart and that no negative pulses appear across the resistors 73 and 73' because of the rectifiers 71 and 71'. The voltage across the resistors 73 and 73' are respectively amplified in transistor amplifier circuits 75 and 75'. The last stage of the amplifier circuits 75 and 75' includes the transistors 77 and 77' having primary windings 80 and 80' of pulse transformers 82 and 82' connected in the collector circuits of the same. The transformers 82 and 82' have pairs of secondary windings 84–85 and 84'–85' across which the turn-on pulses for the thyristors 43–44 and 47–48 are respectively developed. It is apparent that the frequency of these pulses is directly dependent upon the frequency of operation of the relaxation oscillator circuit 53.

Figures 4, 5, 6:
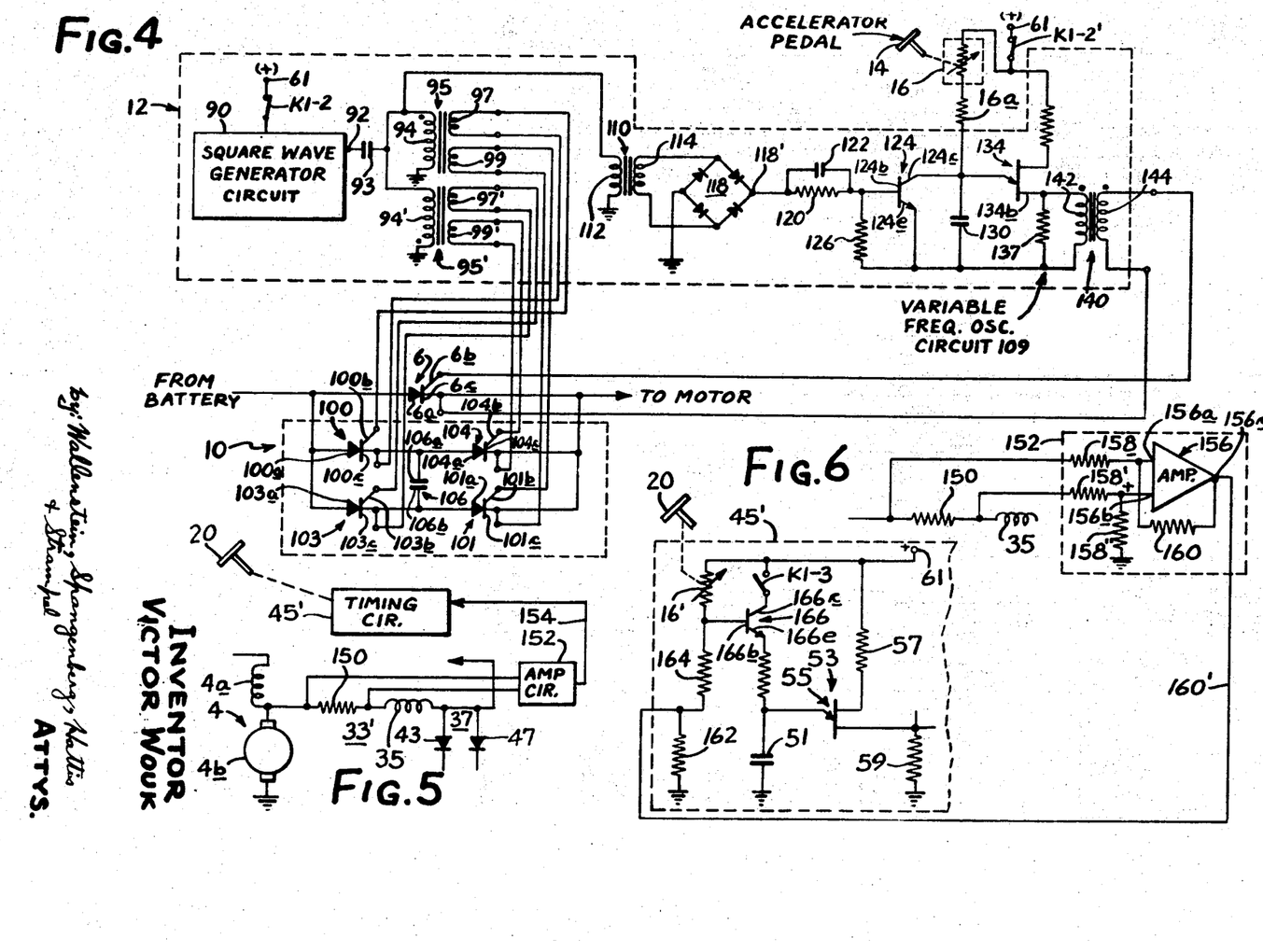
FIG. 4 is a preferred circuit diagram of the speed control portion of the control system shown in FIG. 1.
FIG. 5 is a simplified partial block diagram of a portion of the control system of FIG. 1 to which has been added means for making the braking action of the circuit independent of vehicle speeds.
FIG. 6 shows a preferred circuit for that portion of FIG. 5 shown in block form in FIG. 5.

One of the specific aspects of the invention is the manner in which the power thyristor 6 is reliably rendered conductive and non-conductive by the pulses generated by the timing circuit 12 and the power turn-off control circuit 10. The preferred forms of the latter circuits are shown in FIG. 4, to which reference should now be made.

The timing circuit 12 may comprise a square wave generator circuit 90 which produces at an output terminal 92 a voltage having a square waveform. The aforementioned normally-closed contacts K1–2 of relay K1 which control the energization of the timing circuit 12 are connected between the square wave generator circuit 90 and the source of D.C. voltage 61. A differentiating capacitor 93 is connected between the output terminal 92 and a pair of primary windings 94 and 94' of a pair of transformers 95 and 95'. Positive and negative going pulses appear in the primary windings 94 and 94' of transformers 95 and 95' as a result of the differentiating capacitor 93, which pulses are coincident with the change in the polarity of the square wave output of the square wave generator circuit 90. The transformer 95 has a pair of secondary windings 97 and 99 across which are induced pulses which are 180 degrees out of phase with the pulses induced into the secondary windings 97' and 99' of the transformer 95'.

The pulses developed across windings 97 and 99 are respectively fed to the control and cathode electrodes 100b–100c and 101b–101c of a pair of control thyristors 100–101 and the pulses developed across the windings 97' and 99' are respectively fed to the control and cathode electrodes 103b–103c and 104b–104c of a pair of control thyristors 103–104 forming part of the power turn-off control circuit 10. The pairs of control thyristors 100–101 and 103–104 together form with a turn-off capacitor 106 a thyristor bridge circuit which is substantially similar to the thyristor bridge circuit forming the current control network 37 in the voltage boosting circuit 33. Accordingly, the anode and cathode electrodes 100a–100c of the control thyristor 100 are connected between the anode electrode 6a of the power thyristor 6 and the plate 106a of capacitor 106 and the anode and cathode electrodes 101a–101c of the control thyristor 101 are connected between the plate 106b of capacitor 106 and the cathode electrode 6c of the power thyristor 6. Similarly, the anode and cathode electrodes 103a–103c of the control thyristor 103 are connected between the anode electrode 6a of power thyristor 6 and the capacitor plate 106b, and the anode and cathode electrodes 104a–104b of the control thyristor 104 are connected between capacitor plate 106a and the cathode electrode 6c of power thyristor 6.

During normal operation of the circuit, it is apparent that the square wave generator circuit 90 will be operative since the associated normally closed contacts K1–2 will be closed, and control thyristor firing pulses will be fed during alternate half cycles to the control electrodes and 100b–101b and 103b–103b of the control thyristor pairs 100–101 and 103–104 to fire these pairs of thyristors during alternate half cycles of the square wave generator output. When the control thyristors 100–101 are fired, the capacitor 106 will charge to the voltage output of the battery 2 with the plate 106a being positive with respect to the plate 106b. When the capacitor 106 becomes fully charged, current flow will terminate to render the control thyristors 100–101 nonconductive. As will appear, when the power thyristor 6 is subsequently fired, it can be rendered non-conductive by the firing of the control thyristors 103–104 which will connect the plate 106b of the capacitor 106 which then is at a negative potential to the anode electrode 6a of the conducting power thyristor 6 and the plate 106a which is at a positive potential to the cathode electrode 6c of the power thyristor 6, thereby to render the power thyristor 6 non-conductive. As soon as the capacitor 106 renders the power thyristor 6 non-conductive, the capacitor 106 will discharge and then reverse charge to the voltage of the battery 2 to make the plate 106b positive with respect to the plate 106a, so that the capacitor 106 is then operative to render the power thyristor 6 non-conductive during the subsequent half cycle of the output of the square wave generator circuit 90 when the control thyristors 100–101 are fired.

As previously indicated, it is imperative that when power is initially applied to the control circuit of FIG. 1 that either the control thyristors 100–101 or 103–104 be fired before the power thyristor 6. If the power thyristor 6 should fire first, then the capacitor 106 could never be charged because the conduction of the power thyristor 6 will provide a short across the bridge circuit 10 to prevent the operation thereof.

To insure that the power thyristor 6 cannot be fired prior to the control thyristor pairs 100–101 and 103–104 of the power turn-off circuit 10, the square wave generator circuit 90 acts as a master timing oscillator also for variable frequency oscillator circuit 109 which produces turn-on pulses for the power thyristor 6 delayed from the differentiated output of the square wave generator circuit 90.

The variable frequency oscillator circuit 109 is synchronized from an input circuit including a transformer 110 having a primary winding 112 connected between the differentiating capacitor 93 and ground, and a secondary winding 114 which couples the differentiated pulses to a full wave rectifier circuit 118 connected across the secondary winding 114 so as to provide only positive pulses at the output terminal 118' of the full wave rectifier circuit. The pulses at the output terminal 118' are coupled through a network comprising a resistor 120 in parallel with a capacitor 122 to the base electrode 124b of a NPN transistor 124. A resistor 126 is connected between the base electrode 124b of the transistor 124 and ground, and the emitter and collector electrodes 124e and 124c of the transistor 124 are respectively connected across the capacitor 130 which forms the timing capacitor of a unijunction transistor relaxation oscillator circuit like the previously described circuit 53 in FIG. 3.

When a positive pulse is delivered to the base electrode 124b of the transistor 124, the transistor becomes highly conductive to rapidly discharge the capacitor 130 if it was previously charged and initiate the beginning of a charge period for the capacitor 130. When power is initially applied to the timing circuit 12, the capacitor 130 will probably be discharged. The capacitor 130 is connected in series with the aforementioned variable impedance 16 which is adjusted by the positioning of the accelerator pedal 14. The variable impedance 16 is in FIG. 4 a variable resistor which is connected through a set of normally-closed contacts K1–2' of the relay K1 to a source 61 of positive voltage. The juncture of capacitor 130 and resistor 16 is connected through a current limiting resistor 16a to the emitter electrode of a unijunction transistor 134. It can thus be seen that when power is initially applied to the circuit now being described, the capacitor 130 will charge through the resistor 16, the charge time being sufficiently slow that the square wave generator circuit will already have generated the square wave voltage from which the pulses are produced to fire the control thyristor pairs 100–101 and 103–104 to charge the capacitor 106 before the relaxation circuit 109 operates to produce any pulses. When the voltage across the capacitor 130 reaches the firing voltage of the unijunction transistor 134, the transistor 134 will conduct heavily to discharge the capacitor 130 and develop a voltage across a resistor 137 connected between the bottom base 134b' of the unijunction transistor 134 and ground. The primary winding 142 of the transformer 140 is coupled across the resistor 137 so that a pulse appears across the winding 142 when the unijunction transistor 134 fires. These pulses appear in the secondary winding 144 of the transformer 140 and are fed to the base and cathode electrodes 6b–6c of the power transistor 6.

It is apparent that as the resistor 16 varies in value with the position of the accelerator pedal 14, the time it takes the capacictor 130 to reach the firing voltage of the unijunction transistor 134 will vary accordingly. Since a higher speed requires a higher duty cycle of the thyristor 6, the value of resistor 16 decreases as the accelerator pedal 14 is depressed.

Refer now to FIG. 5 which shows a modification in the voltage boosting circuit 33 and timing circuit 45 of FIG. 1 wherein the amount of braking action for a given degree of depression of the brake pedal 20 does not substantially vary with the speed of the vehicle, down to the lowest speed at which regenerative braking is to be effective. For a given field current, as the motor armature 4b slows down, the voltage developed across the motor armature 4b slows down, the voltage developed across the motor armature 4b and the output current of the voltage boosting circuit 33 in FIG. 1 will decrease even though the brake pedal is held in the same depressed position. To maintain a substantially constant average current output of the voltage boosting circuit with varying speed for a given depression of the brake pedal in accordance with a preferred specific aspect of the invention, the frequency at which the modified timing circuit 45' operates to fire the control thyristor pairs 43–44 and 47–48 of the modified voltage boosting circuit 33' shown in FIG. 5 is varied with speed so that any tendency of the average current flowing through the inductance 35 to increase or decrease for a given depression at the brake pedal 20 is countered respectively by a decrease or increase in the frequency at which current is interrupted in the current control network 37. To this end, a resistor 150 is connected in series with the inductance 35 so that the voltage developed across the resistor 150 is a measure of the average current flowing from the voltage boosting circuit 33' to the batteries 2. This resistor must be exceedingly small so that only a small amount of power is lost therein. For example, this resistor is so small that the voltage drop thereacross is as small as about 50 millivolts. This voltage is fed to an amplifier circuit 152 which feeds a control signal to the timing circuit 45' so as to respectively raise and lower the frequency of operation of the timing circuit 45' as the voltage drop across the resistor tends to decrease or increase.

Refer now to FIG. 6 which illustrates an exemplary amplifier circuit 152 and modified timing circuit 45'. The amplifier circuit 152 as illustrated includes a standard commercial integrated operational amplifier unit 156 which may be a type uA709 or equivalent manufactured by a number of manufacturers. This amplifier unit has a pair of inputs 156a and 156b respectively connected through resistors 158 and 158' to the negative and positive ends of the resistor 150. The positive amplifier input terminal 156b is connected through a resistor 158" to ground. A resistor 160 is connected between the output terminal 156c of the amplifier unit 156 and the negative input terminal 156a thereto. One end of a load resistor 162 is connected by a conductor 160' to the amplifier unit output terminal 156c and the other end of resistor 162 is grounded. The values of the resistors associated with the amplifier unit 156 are selected to provide proper amplification which may be of the order of magnitude of about 100–200.

The ungrounded end of a resistor 162 may be connected through a resistor 164 to the base electrode 166b of a NPN transistor 166 forming with the associated impedance elements a unity gain amplifier circuit. The transistor 166 has an emitter electrode 166e connected through a resistor 168 to the charging capacitor 51 of the unijunction relaxation oscillator circuit 53 and whose collector electrode 166c is connected through the normally-open contacts K1–3 of the relay K1 to the positive voltage terminal 61. The emitter to collector circuit of the transistor 166 has thus replaced the brake pedal controlled resistor 26 in the relaxation oscillator circuit of FIG. 3 (which resistor is relocated in the base electrode circuit of the transistor 166). The voltage to which the capacitor in FIG. 6 charges depends upon the voltage present in the base electrode circuit of the transistor 166.

The voltage on the base electrode 166b of the transistor 166 is principally determined by the value of a brake pedal controlled resistance 26' connected between the base electrode 166b and the positive terminal 61. Thus, as the brake pedal 20 is depressed and released, the value of the resistance 26' will respectively decrease and increase to increase and decrease the magnitude of the positive voltage on the base electrode 166b which will respectively increase and decrease the frequency of operation of the relaxation oscillator circuit 53 of which the unijunction transistor 55 is a part.

The bias conditions of the base electrodes 166b of the transistor 166 is also controlled by the voltage developed by the amplifier unit 156 across the resistor 162. When the brake pedal 20 is depressed the voltage boosting circuit fed from the motor armature will feed a given current to the batteries 2 depending on the initial speed of the vehicle and the degree to which the brake pedal is depressed, and any tendency of the current flow from the voltage boosting circuit 33' to decrease as the vehicle speed decreases is countered by the amplifier unit 156 which feeds a progressively increasing positive voltage (or a decreasingly negative voltage) to the base electrode 166b of transistor 166 to increase progressively the frequency of the relaxation oscillator circuit 53 to stabilize the current flowing from the voltage boosting circuit 33' to the batteries.

It is thus apparent that the various aspect of the invention provide reliable and smooth braking and speed control of a battery operated vehicle and in a manner which maximizes the capacity of the battery by taking advantage of the deacceleration or braking of the automotive vehicle efficiently to recharge the battery at even relatively low speeds. Also, the preferred form of the invention provides speed and braking control performance which are similiar to that of conventional automotive vehicles. Furthermore, by combining mechanical and regenerative braking in the manner described, the maintenance required by the mechanical braking system is minimized, the life of the mechanical braking system is maximized and greater reliability of the braking system is achieved.

It should be understood that numerous modifications may be made in the most preferred form of the invention described above without deviating from the broader aspects thereof.

I claim:

1. In an electric automotive vehicle driven by a D.C. motor having a series field winding and an armature both energized from a battery and having a driver-operated braking control member, said motor also having a shunt field winding, a braking and battery recharging system for the automotive vehicle comprising: motor circuit modifying means responsive to operation of said braking control member by connecting said shunt field winding across said armature to convert the motor to an electric generator which effects the production of a D.C. voltage substantially in excess of the battery voltage for car speeds extending from a normal cruising speed down to given relatively low speed which is a fraction of the cruising speed, means responsive to operation of said braking control member by operatively coupling the output of the electric generator to said battery to charge the same and effect regenerative braking of the automotive vehicle, normally inoperative mechanical braking means for stopping the car below said given relatively low speed, and mechanical brake control means for rendering said mechanical braking means operative below said given relatively low speed.

2. The electric automotive vehicle of claim 1 wherein said mechanical brake control means includes means responsive to the movement of said braking control member beyond a given position by rendering said mechanical braking means operative.

3. The electric automotive vehicle of claim 1 wherein there is provided in the connections between the output of the electric generator and said battery a voltage boosting circuit which boosts the voltage output of the generator fed to the battery.

4. The electric automotive vehicle of claim 3 wherein said voltage boosting circuit thereof includes means for varying the average amount of current flowing through the voltage boosting circuit in accordance with the degree of movement of said braking control member, wherein the amount of regenerative braking force for a given speed of the vehicle depends upon the extent to which the braking control member is operated.

5. The electric automotive vehicle of claim 1 wherein there is provided in said braking and battery recharging system additional means for providing a relatively constant and progressively different output current of said electric generator for each progressively different position of said braking control member, which current does not substantially vary with vehicle speeds between said cruising and relatively low speed.

6. The vehicle of claim 1 wherein said shunt field winding is coupled across said armature during normal operation of the D.C. electric motor through a relatively high impedance path to prevent runaway of the motor under no load conditions and is coupled across said armature through a relatively low impedance path during braking.

7. In an electric automotive vehicle driven by a D.C. motor having a series field winding and an armature both energized from a battery, said motor also having a shunt field winding, the improvement comprising: motor braking and battery charging means including motor circuit modifying means operable upon deacceleration of the vehicle by connecting said shunt field winding across said armature to convert the motor to an electric generator which effects the production of a D.C. voltage substantially in excses of the battery voltage for vehicle speeds extending from a given upper speed down to a given relatively low speed which is a fraction of said given upper speed, a voltage boosting circuit coupled to the output of the electric generator which boosts the output voltage of the generator, and coupling means for coupling the output of the voltage boosting circuit to said battery to charge the same and regeneratively brake the vehicle.

8. The combination of claim 7 wherein there is provided an operator controlled braking control member for effecting deacceleration of the vehicle and charging of the battery, said motor circuit modifying means being rendered operable by movement of said braking control member from a reference position, and said voltage boosting circuit includes means for varying the average amount of current flowing through the voltage boosting circuit in accordance with the degree of movement of said braking control member, wherein the amount of regenerative braking force for a given speed of the generator depends upon the extent to which the braking control member is moved.

9. The combination of claim 8 wherein there is provided additional means for providing a relatively constant and progressively different output current of said electric generator for each progressively different position of said braking control member, and substantially independent of the vehicle speed down to said relatively low speed.

10. The vehicle of claim 8 wherein said shunt field winding is substantially decoupled from the battery during normal operation of the motor and coupled through a relatively low impedance path to said battery during braking of the vehicle.

11. The vehicle of claim 7 wherein said voltage boosting circuit includes an inductance coupled to one of the terminals of the motor armature, current control means coupled between the end of the inductance remote from one armature terminal and the other armature terminal, means coupling the end of the inductance remote from the motor ramature to one terminal of said battery, and means for periodically rendering said current control means momentarily conductive, whereby the periodic interruption of current flow through said current control means provides said boost voltage.

12. The combination of claim 11 wherein there is provided an operator controlled braking control member for effecting deacceleration of the vehicle and charging of the battery, said motor circuit modifying means is rendered operable by movement of said braking control member from a reference position, and said means for periodically rendering said current control means momentarily conductive is responsive to the position of said braking control member for varying the frequency of the operation thereof in direct proportion to the degree of movement of said braking control member from a reference position and in inverse proportion to the speed of the vehicle down to said relatively low speed.

13. The combination of claim 11 wherein there is provided an operator controled braking control member for effecting deacceleration of the vehicle and charging of the battery, said motor circuit modifying means being rendered operable by movement of said braking control member from a reference position, and said means for periodically rendering said current control means momentarily conductive being responsive to the position of said braking control member for varying the frequency of the operation thereof with the position of the control member, to vary the magnitude of the average charging current fed to said battery.

14. In an electric automotive vehicle driven by a D.C. electric motor including an armature to be energized from a battery, the improvement on motor braking and battery charging means comprising: motor circuit modifying means operable upon braking of the vehicle by converting the electric motor to an electric generator which effects the production of a D.C. voltage substantially in excess of the battery voltage for vehicle speeds extending from a given upper speed down to a given relatively low speed which is a fraction of said given upper speed; a voltage boosting circuit coupled to the output of the electric generator which boosts the output voltage of the generator, said voltage boosting circuit including an inductance coupled to one of the terminals of the motor armature, current control means coupled between the end of the inductance remote from said one armature terminal and the other armature terminal, said current control means comprising a capacitor having a pair of plates, a first pair of thyristor devices, one of which is connected between one of said capacitor plates and said remote end of said inductance and the other of which is connected between the other capacitor plate and said other armature terminal, wherein the simultaneous firing of said first pair of thyristors will effect first the discharging and then the reverse charging of the capacitor and will effect the momentary conduction of said first pair of thyristors, a second pair of thyristor devices, one of which is connected between said other capacitor plate and said remote end of said inductance and the other of which is coupled between said one capacitor plate and said other armature terminal, wherein the simultaneous firing of said second pair of thyristors will effect first the discharging and then the reverse charging of the capacitor and will effect and momentary conduction of said second pair of thyristors, and means for alternately simultaneously firing said first and second pairs of thyristors; and means for coupling the end of said inductance remote from the motor armature to said battery.

15. The vehicle of claim 14 wherein there is provided an operator controlled braking control member for effecting deacceleration of the vehicle and charging of the battery, said motor circuit modifying means is rendered operable by movement of said braking control member from a reference position, and said means for alternately firing said pairs of thyristors being responsive to the position of said braking control member by varying the frequency of the firing thereof with the position of the control member, to vary magnitude of the average charging current fed to said battery.

16. In an electric automotive vehicle driven by a D.C. series electric motor energized from a battery power source, the motor having a normally operative series winding, a shunt winding and an armature with a pair of armature terminals across which said battery is to be coupled through the series winding to energize the motor, the automotive vehicle having a speed control member progressively movable from a reference position to vary the speed of the electric motor, and a braking control member progressively movable from a reference position to vary the braking force applied to the vehicle, a circuit for controlling the operation of said electric motor comprising: a power thyristor having load terminals coupled between said battery and said series winding and motor armature terminals and a control terminal for firing the same, power thyristor control means for adjusting the average turn-on period of the power thyristor in accordance with the position of the speed control member, normally open switch means in the circuit between said battery and shunt winding, said switch means being responsive to movement of said braking control member away from said reference position by closing the latter circuit so the motor operates as a generator, a voltage boosting circuit coupled across the armature terminals of the motor which produces a boosted voltage at the output thereof when the motor acts as a generator which boosted voltage is in substantial excess of the battery voltage to charge the battery and to provide regenerative braking for the vehicle, said voltage boosting circuit including means for varying the average current flow through the voltage boosting circuit in accordance with the spacing of said braking control member relative from said reference position, and rectifier means coupled between the output of the voltage boosting circuit and said battery for coupling the boosted voltage to charge the battery and brake the motor.

17. In a control circuit for controlling the flow of power from a source of D.C. voltage to a given load the control circuit including, a power thyristor having anode and cathode load terminals to be coupled between the source of D.C. voltage and said load and a control terminal for firing the thyristor, the improvement comprising: a thyristor control circuit for periodically turning the thyristor on and off, said thyristor control circuit comprising: a power thyristor turn-off capacitor having first and second capacitor plates, first and second control thyristors having control terminals for firing the same and anode and cathode load terminals connected respectively between said first and second capacitor plates and the anode and cathode load terminals of said power thyristors, for coupling the capacitor in a charged condition across the power thyristor load terminals when the thyristor is fired to render the same non-conductive and then to reverse charge the capacitor to the voltage output of the source of D.C. voltage; a third and fourth control thyristor having control terminals for firing the same and anode and cathode load terminals connected respectively between said second and first capacitor plates and the anode and cathode load terminals of said power thyristor for coupling the capacitor in a reverse relation across the power thyristor load terminals first to render the same non-conductive and then to reverse charge the capacitor to the voltage of said source of D.C. voltage; and means for providing power thyristor turn-on pulses on the control terminal of said power thyristor repeatedly to fire the same; means for providing power thyristor turn-off pulses occurring between said turn-on pulses on the control terminals of said control thyristors for simultaneously firing the first and second control thyristors or said third and fourth control thyristors which couple the previously charged capacitor to said load terminals of the power thyristors in a thyristor turn-off relation.

18. The control circuit of claim 17 wherein said means for providing turn-off pulses provides such pulses at predetermined points in time and always in advance of the associated turn-on pulses, whereby the turn-off capacitor is alawys charged to effect a turn-off operation.

19. The control circuit of claim 18 wherein there is provided means for progressively varying the time interval between each turn-off pulse and the associated turn-on pulse, to vary the conducting intervals and hence the average power to the load.

20. The control circuit of claim 17 in combination with a load which is an electric motor of an electric automotive vehicle and a source of D.C. voltage which is a battery therefor, said battery and electric motor respectively coupled to the input and output sides of said power thyristor.

21. The control circuit of claim 13 wherein there is provided a master oscillator for generating timing pulses from which said turn-on and turn-off pulses are both derived, said means for providing the turn-off pulses being coupled to the output of said master oscillator which is the source of said turn-off pulses, and said means for providing said turn-on pulses being synchronized from the master oscillator and including pulse delay means for providing a first turn-on pulse after the generation of a first turn-off pulse following energization of the thyristor control circuit, ensuring the initial charging of said capacitor.

22. In an electric automotive vehicle driven by a D.C. electric motor having field windings and an armature energized from a battery and having a driver-operated braking control member, a braking and battery recharging system for the automotive vehicle comprising: motor circuit modifying means responsive to operation of said braking control member by converting the electric motor to an electric generator which effects the production of a D.C. voltage substantially in excess of the battery voltage for car speeds extending from a normal cruising speed down to a given relatively low speed which is a fraction of the cruising speed, means responsive to operation of said braking control member by operatively coupling the output of the electric generator to said battery to charge the same and effect regenerative braking of the automotive vehicle, and means for providing a relatively constant and progressively different output current for said electric generator for each progressively different position of said braking control member, which current does not substantially vary with vehicle speed between said cruising and relatively low speed.

23. In an electric automotive vehicle driven by a D.C. electric motor having a field winding and armature energized from a battery, the improvement comprising: motor braking and battery charging means including motor circuit modifying means operable upon deacceleration of the vehicle by converting the electric motor to an electric generator which effects the production of a D.C. voltage substantially in excess of the battery voltage for vehicle speeds extending from a given upper speed down to a given relatively low speed which is a fraction of said given upper speed, a voltage boosting circuit coupled to the output of the electric generator which boosts the output voltage of the generator, means for coupling the output of the voltage boosting circuit to said battery to charge the same and regeneratively brake the vehicle, and a flyback diode coupled across said armature at least during braking of the vehicle and connected in a direction to maintain current flow through the motor upon interruption of the connection of said battery to said D.C. motor.

References Cited
UNITED STATES PATENTS

| | | | |
|---|---|---|---|
| 2,530,131 | 11/1950 | Roters | 318—371 |
| 3,325,714 | 1/1967 | Torii | 318—376 |
| 3,271,649 | 9/1966 | Jurgensen | 318—269 |
| 3,365,642 | 1/1968 | Risberg | 318—376 |
| 3,454,122 | 7/1969 | Grady, Jr. | 318—139 |

ORIS L. RADER, Primary Examiner

K. L. CROSSON, Assistant Examiner

U.S. Cl. X.R.

318—247, 258, 376